(12) United States Patent
Schwartz et al.

(10) Patent No.: US 7,070,648 B1
(45) Date of Patent: Jul. 4, 2006

(54) PREPARATION OF GYPSUM COMPOSITIONS

(75) Inventors: Steven A. Schwartz, Downington, PA (US); Frank J. Liotta, Jr., Downington, PA (US); Edward A. Barsa, Glen Mills, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 0 days.

(21) Appl. No.: 11/153,966

(22) Filed: Jun. 16, 2005

(51) Int. Cl.
*C04B 24/24* (2006.01)
(52) U.S. Cl. .................. 106/772; 106/778; 52/443; 52/449
(58) Field of Classification Search ............... 106/772, 106/778; 52/443, 449
See application file for complete search history.

(56) References Cited

U.S. PATENT DOCUMENTS

| | | | | |
|---|---|---|---|---|
| 4,872,885 | A |   | 10/1989 | Tsubakimoto et al. ......... 44/51 |
| 4,988,390 | A | * | 1/1991 | Kambayashi et al. ....... 106/774 |
| 5,698,627 | A | * | 12/1997 | Oguni et al. ................ 524/724 |
| 6,221,151 | B1 |   | 4/2001 | Campbell et al. ........... 106/778 |
| 6,409,823 | B1 |   | 6/2002 | Shake et al. ................ 106/772 |
| 6,409,825 | B1 |   | 6/2002 | Yu et al. ..................... 106/776 |
| 6,527,850 | B1 | * | 3/2003 | Schwartz et al. ........... 106/772 |

OTHER PUBLICATIONS

M. J. Ridge, M.Sc., "Mechanism of Setting of Gypsum Plaster," *Reviews of Pure and Applied Chemistry*, vol. 10, No. 4, 1960, pp. 243-276.
B. R. Smith and A. E. Alexander, "The Effect of Additives on the Process of Crystallization," *Journal of Colloid and Interface Science*, vol. 34, No. 1, Sep. 1970, pp. 81-90.
M. C. Van Der Leeden and G. M. Van Rosmalen, "Aspects of Additives in Precipitation Processes: Performance of Polycarboxylates in Gypsum Growth Prevention," Elsevier Science Publishers B.V., Amsterdam, *Desalination*, 66 (1987), pp. 185-200.
M. Öner, Ö. Dogan, G. Ö ner, "The Influence of polyelectrolytes architecture on calcium sulfate dihydrate growth retardation," Elsevier Science B.V., *Journal of Crystal Growth* 186 (1998), pp. 427-437.

* cited by examiner

*Primary Examiner*—Robert D. Harlan
(74) *Attorney, Agent, or Firm*—Shao-Hua Guo

(57) ABSTRACT

A gypsum composition containing a sulfonate-containing comb-branched copolymer is disclosed. The sulfonate-containing comb-branched copolymer comprises recurring units of a polyether macromonomer, an acrylic monomer, and a sulfonate monomer. The sulfonate-containing comb-branched copolymer not only increases the fluidity of gypsum slurry but also has reduced retardation on the gypsum setting.

15 Claims, No Drawings

PREPARATION OF GYPSUM COMPOSITIONS

FIELD OF THE INVENTION

The invention relates to gypsum compositions. The gypsum composition comprises a sulfonate-containing comb-branched copolymer. The comb-branched copolymer improves the fluidity of the gypsum composition.

BACKGROUND OF THE INVENTION

Gypsum is commonly manufactured by drying, grinding, and calcining natural gypsum rock. The drying step involves passing crude gypsum rock through a rotary kiln to remove free moisture. The dried rock is then ground. The calcination is to dehydrate the ground gypsum rock to hemihydrate:

$$CaSO_4 \cdot 2H_2O + heat \rightarrow CaSO_4 \cdot \tfrac{1}{2}H_2O + 3/2H_2O$$

Gypsum reacts with water and sets rather quickly. The setting is a reversal of the calcination. The hemihydrate gypsum dissolves in water until it is saturated. The soluble hemihydrate forms dihydrate which is less soluble than hemihydrate. As dihydrate crystals precipitate, the hemihydrate solution is no longer saturated, and the process continues to consume the hemihydrate gypsum. The reaction can be followed by measuring the heat evolved. Initially there is very little reaction and no rise in temperature. This time is referred to as the induction period. As the amount of dihydrate increases, the mass thickness increases, and the gypsum sets.

A large amount of excess water is generally required to provide the gypsum slurry with sufficient fluidity during the process. It is desirable to reduce the amount of excess water to save energy and production cost associated with water removing.

Water reducing agents are known. For example, naphthalene sulfonate has been used as a water reducing agent. One drawback of naphthalene sulfonate is that it requires a high dosage. Further, gypsum compositions containing naphthalene sulfonate tend to set too fast. To slow down the setting, a setting retardant is often added.

Recently, acrylic-polyether comb-branched copolymers are used as water reducing agents in gypsum compositions. See U.S. Pat. No. 6,527,850. The comb-branched copolymers can be used in much lower dosages than naphthalene sulfonate. However, the comb-branched copolymers tend to retard the setting.

In sum, new water reducing agents are needed. Ideally, the water reducing agents would not only improve the fluidity but also have no or reduced retardation on gypsum setting.

SUMMARY OF THE INVENTION

The invention is a gypsum composition. The gypsum composition comprises a sulfonate-containing comb-branched copolymer. The comb-branched copolymer comprises recurring units of a polyether macromonomer, an acrylic monomer, and a sulfonate monomer. We surprisingly found that the sulfonate-containing comb-branched copolymer not only improves the fluidity but also has reduced retardation on the gypsum setting.

DETAILED DESCRIPTION OF THE INVENTION

The gypsum composition of the invention comprises water, gypsum, and a sulfonate-containing comb-branched copolymer. The comb-branched copolymer comprises recurring units of a polyether macromonomer, an acrylic monomer, and a sulfonate monomer.

Suitable polyether macromonomers have a polyether chain and a C=C double bond, which can be located either at the end of or inside the polyether chain. Examples include polyether monoacrylates, polyether monometha-crylates, polyether monoallyl ethers, polyether monomaleates, and polyether monofumarates. The polyether of the macromonomer is an alkylene oxide polymer having a number average molecular weight preferably within the range of about 500 to about 10,000, more preferably within the range of about 1,000 to about 5,000, and most preferably within the range of about 1,000 to about 3,000. Suitable alkylene oxides include ethylene oxide, propylene oxide, butylene oxide, and the like, and mixtures thereof. The polyether macromonomers preferably have hydroxyl functionality from 0 to 5. They can be either linear or branched polymers, homopolymers or copolymers, random or block copolymers, diblock or multiple-block copolymers.

Examples of polyether macromonomers are poly(propylene glycol) acrylates or methacrylates, poly(ethylene glycol) acrylates or methacrylates, poly(ethylene glycol) methyl ether acrylates or methacrylates, acrylates or methacrylates of an oxyethylene and oxypropylene block or random copolymer, poly(propylene glycol) allyl ether, poly(ethylene glycol) allyl ether, poly(propylene glycol) monomaleate, and the like, and mixtures thereof. Preferred polyether macromonomer is selected from the group consisting of poly(propylene glycol) acrylates and methacrylates, poly(ethylene glycol) acrylates and methacrylates, acrylates and methacrylates of oxyethylene and oxypropylene block and random copolymers, and mixtures thereof.

Suitable acrylic monomers derive from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides. Acrylic acid, methacrylic acid, ammonium acrylate, ammonium methacrylate, sodium acrylate, sodium methacrylate, potassium acrylate, and potassium methacrylate are preferred. Most preferred are acrylic acid and methacrylic acid. Particularly preferred acrylic monomer is methacrylic acid.

Suitable sulfonate monomers include those which have a sulfonate group and a polymerizable C=C double bond. Preferably the sulfonate monomer is selected from the group consisting of 2-acrylamido-2-methylpropanesulfonic acid, vinyl sulfonic acid, allyl ether sulfonic acid, 2-sulfoethyl methacrylate, styrene sulfonic acid, methallyl sulfonic acid, their sodium, potassium, ammonium salts, and mixtures thereof. More preferably the sulfonate monomer is selected from the group consisting of 2-acrylamido-2-methylpropanesulfonic acid, styrene sulfonic acid, their sodium, potassium, and ammonium salts, and mixtures thereof.

The relative amounts of polyether macromonomer, acrylic monomer, and sulfonate monomer are determined by many factors within the skilled person's discretion, including the required physical properties of the comb-branched copolymer, the selection of the acrylic and sulfonate monomers, and the properties of the polyether macromonomer.

Preferably, the molar ratio of polyether macromonomer to the sum of acrylic and sulfonate monomers is 1/10 or greater. More preferably, the molar ratio of polyether macromonomer to the sum of acrylic and sulfonate monomers is 1/5 or greater. Preferably, the molar ratio of acrylic monomer to sulfonate monomer is within the range of 1/10 to 10. More preferably, the molar ratio of acrylic monomer to sulfonate monomer is within the range of 1/2 to 1.

Optionally, other monomers may be incorporated into the comb-branched copolymer. Examples of other monomers include vinyl aromatics, vinyl halides, vinyl ethers, vinyl esters, vinyl pyrrolidinones, conjugated dienes, unsaturated phosphonic acids, and the like, and mixtures thereof. The amount of other monomers used depends on the required physical properties of the comb-branched copolymer product but is preferably less that 50% by weight of the comb-branched copolymer.

The comb-branched copolymer can be made by batch, semi-batch and continuous polymerization process. It is preferably made by a continuous process. In one process, a monomer stream, an initiator stream, and an optional chain transfer agent stream are formed. The polymerization is carried out by continuously feeding a reactor the three streams.

Alternatively, the polymerization can be performed by a multiple-zone process. The multiple-zone process comprises forming a monomer stream, an initiator stream, and an optional chain transfer agent stream, polymerizing the streams in a first reactor, and transferring a first polymer stream from the first reactor to a second reactor wherein the polymerization continues. The multiple-zone process enhances monomer conversion and process efficiency.

The monomer stream contains the polyether macromonomer, the acrylic monomer, and sulfonate monomer. Optionally, the monomer stream also includes a solvent. The solvent is used to dissolve the monomer, to assist heat transfer of the polymerization, or to reduce the viscosity of the final product. The solvent is preferably selected from water, alcohols, ethers, esters, ketones, aliphatic hydrocarbons, aromatic hydrocarbons, halides, and the like, and mixtures thereof. Selections of solvent type and amount are determined by the polymerization conditions including reaction temperature. Water and alcohols, such as methanol, ethanol, and isopropanol, are preferred.

The initiator stream contains a free radical initiator. The initiator is preferably selected from the group consisting of persulfates, hydrogen peroxide, organic peroxides and hydroperoxides, azo compounds, and redox initiators such as hydrogen peroxide plus ferrous ion. Persulfates, such as ammonium and potassium persulfate, are preferred.

Optionally, the initiator stream contains a solvent. The solvent is used to dissolve or dilute the initiator, to control the polymerization rate, or to aid heat or mass transfer of the polymerization. Suitable solvents are described above. Selections of solvent type and amount are determined by the nature of the initiator and the polymerization conditions. Water and alcohols such as methanol, ethanol, and isopropanol are preferred when persulfate is used as initiator.

The monomer and initiator streams optionally include a chain transfer agent. Suitable chain transfer agent includes alkyl amines, alkyl sulfides, alkyl disulfides, carbon tetrahalides, allyl ethers, and mercaptans. Mercaptans, such as butyl mercapan, mercaptoacetic and mercaptopropionic acids, are preferred.

Under some conditions, it is preferred to add the chain transfer agent in a separate stream. This is particularly desirable when the chain transfer agent causes decomposition of the initiator or polymerization of the monomer once it is mixed with those components. This is particularly important in a large, commercial scale because these reactions can cause safety problems.

Optionally, the chain transfer agent stream contains a solvent that is used to dissolve or dilute the chain transfer agent. Suitable solvents include water, alcohols, ethers, esters, ketones, aliphatic and aromatic hydrocarbons, halides, and the like, and mixtures thereof. Selections of solvent type and amount are determined by the nature of the chain transfer agent and the polymerization conditions. Water and alcohols, such as methanol, ethanol, and isopropanol, are preferred.

The comb-branched copolymer has a weight average molecular weight preferably within the range of 10,000 to 150,000, more preferably within the range of 50,000 to 150,000, most preferably within the range of 50,000 to 100,000. It preferably has a molecular weight distribution Mw/Mn less than 3. More preferably, it has Mw/Mn less than 2. The comb-branched copolymer not only reduces the consistency but also leads to a quick setting of the gypsum composition.

The comb-branched copolymer is preferably fully or partially neutralized if the acrylic or sulfonate monomers are acids. Suitable neutralizing agents include alkali metal oxides and hydroxides, alkaline earth metal oxides and hydroxides, ammonium and amines. Examples are sodium hydroxide, potassium hydroxide, calcium hydroxide, ammonium, triethanolamine, diethanolamine, triisopropanolamine, the like, and mixtures thereof.

The amount of the comb-branched copolymer present in the gypsum composition is preferably within the range of 0.001 to 5 wt %, more preferably within the range of 0.05 to 1 wt %, and most preferably within the range of 0.025 to 0.5 wt %.

The gypsum is preferably present in an amount greater than 40 wt % of the gypsum composition. More preferably, it is present in an amount greater than 45 wt % of the gypsum composition. Most preferably, it is present in an amount greater than 50 wt % of the gypsum composition.

Water is used to disperse and set the gypsum. An excess amount of water is needed in processing the gypsum composition. When the gypsum products such as gypsum wallboards are made, the excess water is removed by heating. One advantage of the invention is that a reduced amount of water is used in the gypsum composition so that less time and energy are needed to remove the excess water. The amount of water required in the gypsum composition can be defined as consistency, i.e., the volume of water (ml) required to produce 100 g of gypsum.

Optionally, the gypsum composition comprises a setting accelerator which reduces the initial setting time of the gypsum composition. Examples of suitable setting accelerators include metal sulfates, oxides and hydroxides such as sodium sulfate, calcium sulfate, and calcium hydroxide. Suitable accelerators include those treated with sugar, starch and boric acids as taught by U.S. Pat. No. 6,409,823.

The invention includes articles made from the gypsum composition such as wallboards. Methods for making gypsum wallboards are known. See, for instance, U.S. Pat. No. 6,527,850.

The following examples merely illustrate the invention. Those skilled in the art will recognize many variations that are within the spirit of the invention and scope of the claims.

EXAMPLE 1

Preparation of Comb-Branched Copolymers

Preparation of Polymer A

Step 1: forming the following streams:
Monomer stream: 2-acrylamindo-2-methyl-1-propane-sulfonic acid (62 parts by weight), methacrylic acid (39 parts by weight) and distilled water (545 parts by weight) are mixed. Sodium hydroxide (24 parts by weight, 50% aqueous solution) is added to the mixture to neutralize the acids. An acrylate of oxyethylene/oxypropylene random copolymer having oxyethylene/oxypropylene ratio 70/30 by weight and number average molecular weight Mn of 3,000 (449 parts by weight) is added to the mixture.
Chain transfer stream: 0.9 wt % 3-mercaptopropionic acid aqueous solution.
Initiator stream: 1.8 wt % ammonium persulfate aqueous solution.

Step 2: continuously feeding the three streams to a reactor in the rates: monomer stream: 2.75 ml/min; chain transfer stream: 0.76 ml/min; and initiator stream: 0.217 ml/min. The polymerization is performed at a temperature of about 66° C. A polymer stream is continuously withdrawn from the reactor with a residence time of about 100 min.

The copolymer has a weight average molecular weight of 67,000 and molecular weight distribution (Mw/Mn) of 1.40 by GPC. The GPC analysis is performed on HP 1100 Series; Tosohaas (TSKgel) G4000PW GPC Column 300 mm×7.5 mm ID, particle size 17 (μm) (Aldrich); mobile phase: 1% KNO3 aqueous solution.

Preparation of Polymers B and C
Polymers B and C are prepared according to the above procedure by varying the amounts and types of monomers. In Polymer B, sodium styrene sulfonate is used. In Polymer C, no sulfonate monomer is used. The compositions, molecular weights, and molecular weight distributions are listed in Table I.

EXAMPLES 2–3 AND

COMPARATIVE EXAMPLES C4–C5

Preparation of Gypsum Composition Slurry

A slurry is prepared by swiftly adding calcined stucco (100 g, CaSO$_4$½H$_2$O, product of Samuel French and Company, Philadelphia, Pa.) and a set accelerator (calcium sulfate dihydrate coated with sugar, 0.1 wt. % of the stucco, product of United States Gypsum Corporation, Libertyville, Ill.) to aqueous solutions (75 ml) containing Polymers A and B, respectively, in Examples 2 and 3. The polymer is used in 0.5 wt % of the stucco.
In Comparative Example C4, no polymer is used.
In Comparative Example C5, a non-sulfonate containing polymer is used.
The slurry is gently hand-agitated for 60 seconds using a ¾" metal spatula in order to provide uniform wetting of the gypsum. This is immediately followed by more vigorous mixing for 30 seconds at a rate of about 160 strokes/min. The slurry is immediately poured into a funnel (½" outlet diameter) that is positioned 90 mm above a clean, glass plate. The slurry flows through the funnel to produce a circular gypsum patty. Fluidity is determined by the diameter of the resulting circular patty. Set times are determined by a "knife-set" test and a ¼ pound and 1 pound Gillmore Needle Tests (ASTM C266). The knife-set time is the period over which a knife cut made into the surface of a poured gypsum patty ceases to heal. The Gillmore set time occurs when a weighted needle rests on the surface of the gypsum patty without making a detectable impression. Table II lists the test results which indicate that while all copolymers increase the fluidity of the gypsum slurry, the sulfonate-containing copolymers have significantly reduced retardation on the setting.

TABLE I

COMB-BRANCHED COPOLYMERS

| Polymer | MA mole % | Polyether Macromonomer Mole % | Sulfonate Monomer Type | Sulfonate Monomer Mole % | Mw | Mw/Mn |
|---|---|---|---|---|---|---|
| A | 33 | 17 | AMPS | 50 | 67,000 | 1.4 |
| B | 50 | 17 | SS | 33 | 53,000 | 1.4 |
| C | 83 | 17 | — | 0 | — | — |

MA: methacrylic acid
AMPS: 2-acrylamido methylpropanesulfonic acid
SS: styrene sulfonic acid

TABLE II

PERFORMS OF COMB-BRANCHED COPOLYMERS IN GYPSUM COMPOSITIONS

| Example | Polymer | Average Patty Diameter (mm) | Average Knife Set(s) | Average ¼ lb Gillmore(s) | Average 1 lb Gillmore(s) |
|---|---|---|---|---|---|
| 2 | A | 143 | 205 | 483 | 767 |
| 3 | B | 143 | 211 | 491 | 791 |
| C4 | — | 128 | 189 | 446 | 738 |
| C5 | C | 148 | 248 | 568 | 890 |

We claim:

1. A gypsum composition comprising a gypsum and an aqueous solution of a sulfonate-containing comb-branched copolymer that comprises recurring units of a polyether macromonomer, an acrylic monomer, and a sulfonate monomer.

2. The composition of claim 1 wherein the gypsum is derived from calcium sulfate hemihydrate.

3. The composition of claim 1 wherein the polyether macromonomer is selected from the group consisting of poly(propylene glycol) acrylates and methacrylates, poly(ethylene glycol) acrylates and methacrylates, acrylates and methacrylates of oxyethylene and oxypropylene block and random copolymers, and mixtures thereof.

4. The composition of claim 1 wherein the polyether macromonomer is an acrylate or methacrylate of an oxyethylene and oxypropylene copolymer.

5. The composition of claim 1 wherein the polyether macromonomer has a number average molecular weight within the range of 500 to 10,000.

6. The composition of claim 1 wherein the polyether macromonomer has a number average molecular weight within the range of 1000 to 5000.

7. The composition of claim 1 wherein the macromonomer has a molecular weight distribution less than 2.

8. The composition of claim 1 wherein the acrylic monomer is selected from the group consisting of methacrylic acid and its sodium, potassium, and ammonium salts.

9. The composition of claim 1 wherein the sulfonate monomer is selected from the group consisting of 2-acrylamido-2-methylpropanesulfonic acid, styrene sulfonic acid, their sodium, potassium, and ammonium salts, and mixtures thereof.

10. The composition of claim 1 wherein the sulfonate-containing comb-branched copolymer is a copolymer of an acrylate or methacrylate of an oxyethylene and oxypropylene copolymer, methacrylic acid, and 2-acrylamido-2-methylpropanesulfonic acid.

11. The composition of claim 10 wherein the sulfonate-containing comb-branched copolymer is neutralized with a neutralizing agent selected from the group consisting of sodium hydroxide, ammonium, and calcium hydroxide.

12. The composition of claim 1 wherein the sulfonate-containing comb-branched copolymer is a copolymer of an acrylate or methacrylate of an oxyethylene and oxypropylene copolymer, methacrylic acid, and styrene sulfonic acid.

13. The composition of claim 12 wherein the sulfonate-containing comb-branched copolymer is neutralized with a neutralizing agent selected from the group consisting of sodium hydroxide, ammonium, and calcium hydroxide.

14. A method of for making the gypsum composition of claim 1, said method comprising mixing water, a gypsum, and a sulfonate-containing comb-branched copolymer that comprises recurring units of a polyether macromonomer, an acrylic monomer, and a sulfonate monomer.

15. A gypsum wallboard made from the composition of claim 1.

* * * * *